(12) United States Patent
Zhang et al.

(10) Patent No.: US 11,667,272 B2
(45) Date of Patent: Jun. 6, 2023

(54) VEHICLE BRAKE SYSTEM WITH ADAPTIVE PRESSURE CALIBRATION

(71) Applicant: ZF Active Safety US Inc., Livonia, MI (US)

(72) Inventors: Wendy P. Zhang, Farmington Hills, MI (US); Christian Chemnitz, Ransbach-Baumbach (DE); Christoph Probst, Bendorf (DE)

(73) Assignee: ZF Active Safety US Inc., Livonia, MI (US)

( * ) Notice: Subject to any disclaimer, the term of this patent is extended or adjusted under 35 U.S.C. 154(b) by 527 days.

(21) Appl. No.: 16/751,633

(22) Filed: Jan. 24, 2020

(65) Prior Publication Data

US 2020/0238967 A1    Jul. 30, 2020

Related U.S. Application Data

(60) Provisional application No. 62/796,306, filed on Jan. 24, 2019.

(51) Int. Cl.
*B60T 17/22* (2006.01)
*F15B 19/00* (2006.01)
(Continued)

(52) U.S. Cl.
CPC .......... *B60T 17/221* (2013.01); *B60T 13/662* (2013.01); *B60T 13/686* (2013.01); *B60T 13/745* (2013.01);
(Continued)

(58) Field of Classification Search
CPC .............. F15B 19/002; F15B 2211/526; B60T 17/221; B60T 15/028; B60T 13/662; B60T 13/686; B60T 13/745; F16K 31/06
(Continued)

(56) References Cited

U.S. PATENT DOCUMENTS 6,068,237 A * 5/2000 Holmes .................... F16K 31/06
                                                        251/129.18
6,513,371 B1 * 2/2003 Jett ....................... F02M 59/366
                                                        73/114.42

(Continued)

FOREIGN PATENT DOCUMENTS

EP         1876078 A2     1/2008

OTHER PUBLICATIONS

German Search Report for corresponding German Application Serial No. 10 2020 200 846.9, dated Dec. 17, 2020, pp. 1-7.

*Primary Examiner* — William M McCalister
(74) *Attorney, Agent, or Firm* — Robert James Harwood

(57) ABSTRACT

A method of calibrating a solenoid actuated valve includes: providing a brake system including a fluid pressure source: providing a valve having a solenoid, and wherein the valve is in fluid communication with the fluid pressure source; operating the fluid pressure source to provide a constant flow of fluid to the valve; energizing the solenoid of the valve with a constant current such that fluid flows through the valve; measuring the pressure of the fluid flowing at the valve; adjusting the current sent to the solenoid until a predetermined pressure has been obtained; storing a nominal current value of the current required to obtain the predetermined pressure; and calibrating the valve by adding a correction offset factor to the nominal current value for future actuation of the solenoid of the valve.

8 Claims, 12 Drawing Sheets

(51) Int. Cl.
  *B60T 13/66* (2006.01)
  *B60T 13/74* (2006.01)
  *B60T 13/68* (2006.01)
  *F16K 31/06* (2006.01)
  *B60T 15/02* (2006.01)
  *F16K 37/00* (2006.01)

(52) U.S. Cl.
  CPC .......... *F15B 19/002* (2013.01); *B60T 15/028* (2013.01); *F15B 2211/526* (2013.01); *F16K 31/06* (2013.01); *F16K 37/005* (2013.01)

(58) Field of Classification Search
  USPC .......................................................... 73/1.72
  See application file for complete search history.

(56) References Cited

U.S. PATENT DOCUMENTS

| | | | | |
|---|---|---|---|---|
| 6,631,633 B1* | 10/2003 | Garg | .................. | G05D 16/2024 73/1.57 |
| 6,895,798 B2* | 5/2005 | Sosnowski | ......... | G05D 16/2024 73/1.57 |
| 8,321,096 B2* | 11/2012 | Sandstrom | ............ | F15B 19/002 701/51 |
| 2004/0210412 A1* | 10/2004 | Schweikert | ........... | B60T 13/686 73/1.72 |
| 2005/0082905 A1* | 4/2005 | Gronau | ..................... | B60T 8/36 303/11 |
| 2006/0209486 A1* | 9/2006 | Fey | ......................... | B60T 8/367 361/143 |
| 2007/0005216 A1* | 1/2007 | Heinz | ................... | H01F 7/1844 701/78 |
| 2007/0112537 A1* | 5/2007 | Gronau | ................ | B60T 15/028 702/105 |
| 2007/0234340 A1* | 10/2007 | Strasser | ................ | F15B 19/002 717/173 |
| 2010/0090521 A1* | 4/2010 | Loos | ......................... | B60T 8/36 73/1.72 |
| 2014/0371998 A1* | 12/2014 | Moorman | ............. | B60W 10/10 701/53 |
| 2015/0268119 A1* | 9/2015 | Najmolhoda | ......... | F15B 19/002 73/708 |
| 2015/0298670 A1* | 10/2015 | Ullrich | .................. | B60T 8/3655 303/155 |
| 2015/0321653 A1* | 11/2015 | Neu | ...................... | B60T 13/142 303/10 |
| 2016/0236662 A1* | 8/2016 | Neu | ...................... | B60T 8/3275 |

* cited by examiner

VEHICLE BRAKE SYSTEM WITH ADAPTIVE PRESSURE CALIBRATION

CROSS-REFERENCE TO RELATED APPLICATIONS

This application claims priority to U.S. Provisional Patent Application No. 62/796,306, filed Jan. 24, 2019, the disclosure of which is incorporated herein by reference in its entirety.

BACKGROUND

This present disclosure relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Brake systems may also include autonomous braking capabilities such as adaptive cruise control (ACC). During an autonomous braking event, various sensors and systems monitor the traffic conditions ahead of the vehicle and automatically activate the brake system to decelerate the vehicle as needed. Autonomous braking may be configured to respond rapidly in order to avoid an emergency situation. The brake system may be activated without the driver depressing the brake pedal or even if the driver fails to apply adequate pressure to the brake pedal. To improve such brake systems, a method of calibrating a solenoid actuated valve according to claim 1 is suggested. The dependent claims describe advantageous variants of the method.

The method of calibrating a solenoid actuated valve within a brake system comprises: (a) providing a brake system including a fluid pressure source: (b) providing a valve having a solenoid, and wherein the valve is in fluid communication with the fluid pressure source; (c) operating the fluid pressure source to provide a constant flow of fluid to the valve; (d) energizing the solenoid of the valve with a constant current such that fluid flows through the valve; (e) measuring the pressure of the fluid flowing at the valve; (f) adjusting the current sent to the solenoid until a predetermined pressure has been obtained; (g) storing a nominal current value of the current required to obtain the predetermined pressure; and (h) calibrating the valve by adding a correction offset factor to the nominal current value for future actuation of the solenoid of the valve.

In the following advantageous variants of the method are described. Preferably, the method further comprises calibrating the valve to add a correction gain factor by adding a percentage of the nominal current to all data points of future actuation of the solenoid valve. Preferably, the method of calibrating the valve is performed after initial assembly of the valve and installation into the brake system, and wherein periodic calibrations of the valve are performed during the life of the brake system. Preferably, the pressure of the fluid is measured by a pressure sensor of the brake sensor located in the conduit between the fluid pressure source and the valve. Preferably, the fluid pressure source is a plunger assembly. Preferably, the plunger assembly has a housing defining a bore therein, wherein the plunger assembly includes a piston slidably disposed in the bore for pressurizing fluid within a pressure chamber when the piston is moved in a first direction, and wherein the plunger assembly further includes an electrically operated linear actuator for moving the piston within the bore.

BRIEF DESCRIPTION OF THE DRAWINGS

In the following, the method will be described by way of example with reference to several figures. The figures show.

DETAILED DESCRIPTION

Figure 1:
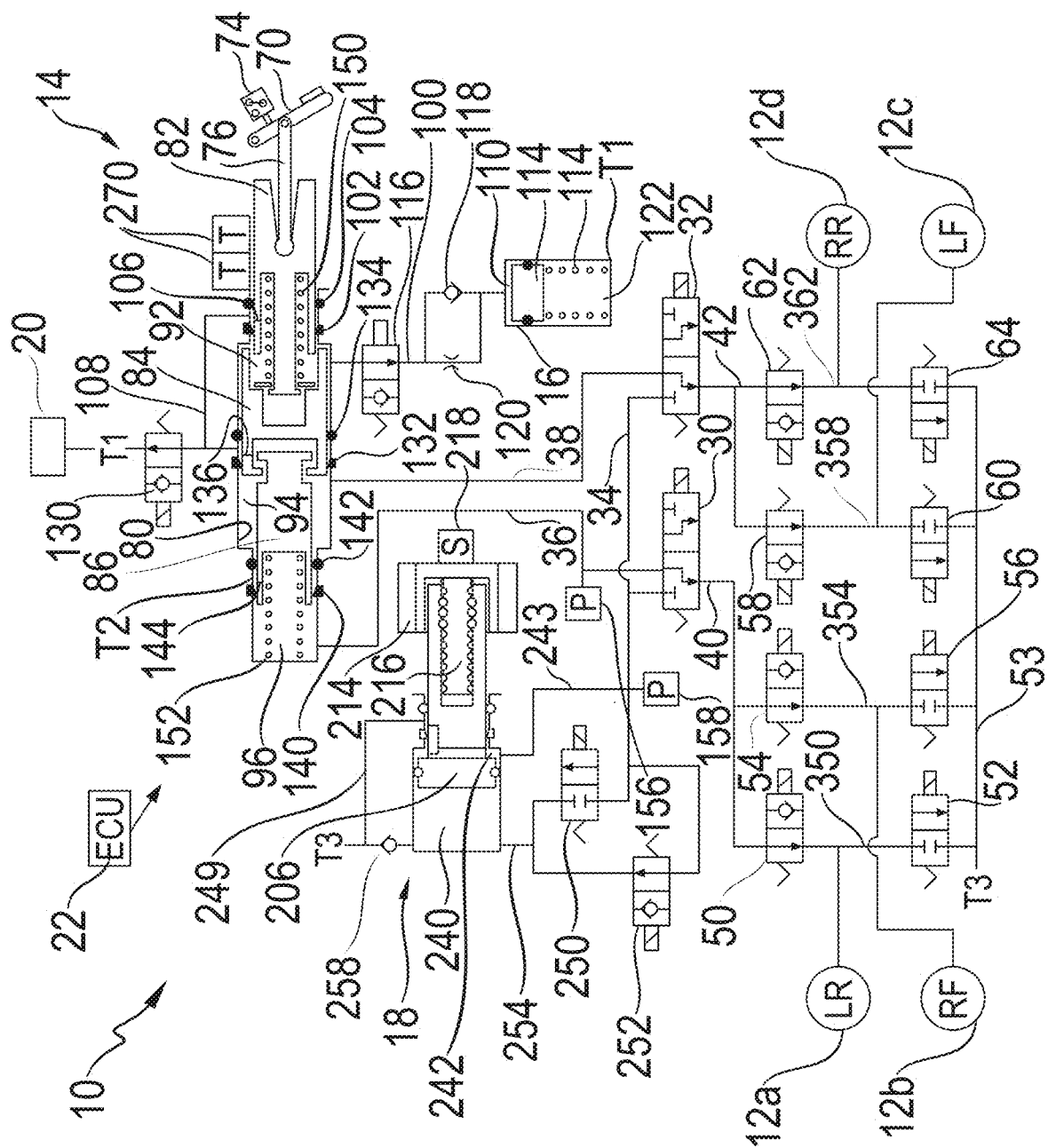
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12a, 12b, 12c, and 12d. The wheel brakes 12a, 12b, 12c, and 12d can have any suitable wheel brake structure operated by the application of pressurized brake fluid. The wheel brakes 12a, 12b, 12c, and 12d may include, for example, a brake caliper mounted on the vehicle to engage a frictional element (such as a brake disc) that rotates with a vehicle wheel to effect braking of the associated vehicle wheel. The wheel brakes 12a, 12b, 12c, and 12d can be associated with any combination of front and rear wheels of the vehicle in which the brake system 10 is installed. A diagonally split brake system is illustrated such that the wheel brake 12 is associated with the left rear wheel, the wheel brake 12b is associated with the right front wheel, the wheel brake 12c is associated with the left front wheel, and the wheel brake 12d is associated with the right rear wheel. Alternatively for a vertically split system, the wheel brakes 12 and 12b may be associated with the front wheels, and the wheel brakes 12c and 12d may be associated with the rear wheels.

The brake system 10 includes a brake pedal unit, indicated generally at 14, a pedal simulator 16, a plunger assembly, indicated generally at 18, and a reservoir 20. The reservoir 20 stores and holds hydraulic fluid for the brake system 10. The fluid within the reservoir 20 is preferably held at or about atmospheric pressure but may store the fluid at other pressures if so desired. The brake system 10 may include a fluid level sensor (not shown) for detecting the fluid level of the reservoir 20. Note that in the schematic illustration of FIG. 1, conduit lines may not be specifically drawn leading to the reservoir 20 but may be represented by conduits ending and labelled with T1, T2, or T3 indicating that these various conduits are connected to one or more tanks or sections of the reservoir 20. Alternatively, the reservoir 20 may include multiple separate housings. As will be discussed in detail below, the plunger assembly 18 of the brake system 10 functions as a source of pressure to provide a desired pressure level to the wheel brakes 12a, 12b, 12c, and 12d during a typical or normal brake apply. Fluid from the wheel brakes 12a, 12b, 12c, and 12d may be returned to the plunger assembly 18 and/or diverted to the reservoir 20.

The brake system 10 includes an electronic control unit (ECU) 22. The ECU 22 may include microprocessors. The ECU 22 receives various signals, processes signals, and controls the operation of various electrical components of the brake system 10 in response to the received signals. The ECU 22 can be connected to various sensors such as pressure sensors, travel sensors, switches, wheel speed sensors, and steering angle sensors. The ECU 22 may also be connected to an external module (not shown) for receiving information related to yaw rate, lateral acceleration, longitudinal acceleration of the vehicle such as for controlling the brake system 10 during vehicle stability operation. Additionally, the ECU 22 may be connected to the instrument cluster for collecting and supplying information related to warning indicators such as an ABS warning light, a brake fluid level warning light, and a traction control/vehicle stability control indicator light.

The brake system 10 further includes first and second isolation valves 30 and 32. The isolation valves 30 and 32 may be solenoid actuated three way valves. The isolation valves 30 and 32 are generally operable to two positions, as schematically shown in FIG. 1. The first and second isolation valves 30 and 32 each have a port in selective fluid communication with an output conduit 34 generally in communication with an output of the plunger assembly 18, as will be discussed below. The first and second isolation valves 30 and 32 also includes ports that are selectively in fluid communication with conduits 36 and 38, respectively, when the first and second isolation valves 30 and 32 are non-energized, as shown in FIG. 1. The first and second isolation valves 30 and 32 further include ports that are in fluid communication with conduits 40 and 42, respectively, which provide fluid to and from the wheel brakes 12a, 12b, 12c, and 12d.

In a preferred embodiment, the first and/or second isolation valves 30 and 32 may be mechanically designed such that flow is permitted to flow in the reverse direction (from conduit 34 to the conduits 36 and 38, respectively) when in their de-energized positions and can bypass the normally closed seat of the valves 30 and 32. Thus, although the 3-way valves 30 and 32 are not shown schematically to indicate this fluid flow position, it is noted that that the valve design may permit such fluid flow. This may be helpful in performing self-diagnostic tests of the brake system 10.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the first isolation valve 30 to the wheel brake 12a, and for cooperatively relieving pressurized fluid from the wheel brake 12 to a reservoir conduit 53 in fluid communication with the reservoir 20. A second set of valves includes a second apply valve 54 and a second dump valve 56 in fluid communication with the conduit 40 for cooperatively supplying fluid received from the first isolation valve 30 to the wheel brake 12b, and for cooperatively relieving pressurized fluid from the wheel brake 12b to the reservoir conduit 53. A third set of valves includes a third apply valve 58 and a third dump valve 60 in fluid communication with the conduit 42 for cooperatively supplying fluid received from the second isolation valve 32 to the wheel brake 12c, and for cooperatively relieving pressurized fluid from the wheel brake 12c to the reservoir conduit 53. A fourth set of valves includes a fourth apply valve 62 and a fourth dump valve 64 in fluid communication with the conduit 42 for cooperatively supplying fluid received from the second isolation valve 32 to the wheel brake 12d, and for cooperatively relieving pressurized fluid from the wheel brake 12d to the reservoir conduit 53. Note that in a normal braking event, fluid flows through the non-energized open apply valves 50, 54, 58, and 62. Additionally, the dump valves 52, 56, 60, and 64 are preferably in their non-energized closed positions to prevent the flow of fluid to the reservoir 20.

The brake pedal unit 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, the brake pedal unit 14 may be used as a back-up source of pressurized fluid to essentially replace the normally supplied source of pressurized fluid from the plunger assembly 18 under certain failed conditions of the brake system 10. The brake pedal unit 14 can supply pressurized fluid in the conduits 36 and 38 (that are normally closed off at the first and second isolation valves 30 and 32 during a normal brake apply) to the wheel brake 12a, 12b, 12c, and 12d as required.

The brake pedal unit 14 includes a housing having a multi-stepped bore 80 formed therein for slidably receiving various cylindrical pistons and other components therein. The housing may be formed as a single unit or include two or more separately formed portions coupled together. An input piston 82, a primary piston 84, and a secondary piston 86 are slidably disposed within the bore 80. The input piston 82 is connected with the brake pedal 70 via a linkage arm 76. Leftward movement of the input piston 82, the primary piston 84, and the secondary piston 86 may cause, under certain conditions, a pressure increase within an input chamber 92, a primary chamber 94, and a secondary chamber 96, respectively. Various seals of the brake pedal unit 14 as well as the structure of the housing and the pistons 82, 84, and 86 define the chambers 92, 94, and 96. For example, the input chamber 92 is generally defined between the input piston 82 and the primary piston 84. The primary chamber 94 is generally defined between the primary piston 84 and the secondary piston 86. The secondary chamber 96 is generally defined between the secondary piston 86 and an end wall of the housing formed by the bore 80.

The input chamber 92 is in fluid communication with the pedal simulator 16 via a conduit 100, the reason for which will be explained below. The input piston 82 is slidably disposed in the bore 80 of the housing of the brake pedal unit 14. An outer wall of the input piston 82 is engaged with a lip seal 102 and a seal 104 mounted in grooves formed in the housing. A passageway 106 (or multiple passageways) is formed through a wall of the piston 82. As shown in FIG. 1, when the brake pedal unit 14 is in its rest position (the driver is not depressing the brake pedal 70), the passageway 106 is located between the lip seal 102 and the seal 104. In the rest position, the passageway 106 permits fluid communication between the input chamber 92 and the reservoir 20 via a conduit 108. Sufficient leftward movement of the input piston 82, as viewing FIG. 1, will cause the passageway 106 to move past the lip seal 102, thereby preventing the flow of fluid from the input chamber 92 into the conduit 108 and the reservoir 20. Further leftward movement of the input piston 82 will pressurize the input chamber 92 causing fluid to flow into the pedal simulator 16 via the conduit 100. As fluid is diverted into the pedal simulator 16, a simulation chamber 110 within the pedal simulator 16 will expand causing movement of a piston 112 within the pedal simulator 16. Movement of the piston 112 compresses a spring assembly, schematically represented as a spring 114. The compression of the spring 114 provides a feedback force to the driver of the vehicle which simulates the forces a driver feels at the brake pedal 70 in a conventional vacuum assist hydraulic brake system, for example. The spring 114 of the pedal simulator 16 can include any number and types of spring members as desired. For example, the spring 114 may include a combination of low rate and high rate spring elements to provide a non-linear force feedback. The simulation chamber 110 is in fluid communication with the conduit 100 which is in fluid communication with the input chamber 92. A solenoid actuated simulator valve 116 is positioned within the conduit 100 to selectively prevent the flow of fluid from the input chamber 92 to the simulation chamber, such as during a failed condition in which the brake pedal unit 14 is utilized to provide a source of pressurized fluid to the wheel brakes. A check valve 118 in parallel with a restricted orifice 120 may be positioned with the conduit 100. The spring 114 of the pedal simulator 16 may be housed within a non-pressurized chamber 122 in fluid communication with the reservoir 20 (T1).

As discussed above, the input chamber 92 of the brake pedal unit 14 is selectively in fluid communication with the reservoir 20 via a conduit 108 and the passageway 106 formed in the input piston 82. The brake system 10 may include an optional simulator test valve 130 located within the conduit 108. The simulator test valve 130 may be electronically controlled between an open position, as shown in FIG. 1, and a powered closed position. The simulator test valve 130 is not necessarily needed during a normal boosted brake apply or for a manual push through mode. The simulator test valve 130 can be energized to a closed position during various testing modes to determine the correct operation of other components of the brake system 10. For example, the simulator test valve 130 may be energized to a closed position to prevent venting to the reservoir 20 via the conduit 108 such that a pressure build up in the brake pedal unit 14 can be used to monitor fluid flow to determine whether leaks may be occurring through seals of various components of the brake system 10.

The primary chamber 94 of the brake pedal unit 14 is in fluid communication with the second isolation valve 32 via the conduit 38. The primary piston 84 is slidably disposed in the bore 80 of the housing of the brake pedal unit 14. An outer wall of the primary piston 84 is engaged with a lip seal 132 and a seal 134 mounted in grooves formed in the housing. One or more passageways 136 are formed through a wall of the primary piston 84. The passageway 136 is located between the lip seal 132 and the seal 134 when the primary piston 84 is in its rest position, as shown in FIG. 1. Note that in the rest position the lip seal 132 is just slightly to the left of the passageway 136, thereby permitting fluid communication between the primary chamber 94 and the reservoir 20.

The secondary chamber 96 of the brake pedal unit 14 is in fluid communication with the first isolation valve 30 via the conduit 36. The secondary piston 86 is slidably disposed in the bore 80 of the housing of the brake pedal unit 14. An outer wall of the secondary piston 86 is engaged with a lip seal 140 and a seal 142 mounted in grooves formed in the housing. One or more passageways 144 are formed through a wall of the secondary piston 86. As shown in FIG. 1, the passageway 144 is located between the lip seal 140 and the seal 142 when the secondary piston 86 is in its rest position. Note that in the rest position the lip seal 140 is just slightly to the left of the passageway 144, thereby permitting fluid communication between the secondary chamber 96 and the reservoir 20 (T2).

If desired, the primary and secondary pistons 84 and 86 may be mechanically connected with limited movement therebetween. The mechanical connection of the primary and secondary pistons 84 and 86 prevents a large gap or distance between the primary and secondary pistons 84 and 86 and prevents having to advance the primary and secondary pistons 84 and 86 over a relatively large distance without any increase in pressure in the non-failed circuit. For example, if the brake system 10 is under a manual push through mode and fluid pressure is lost in the output circuit relative to the secondary piston 86, such as for example in the conduit 36, the secondary piston 86 will be forced or biased in the leftward direction due to the pressure within the primary chamber 94. If the primary and secondary pistons 84 and 86 were not connected together, the secondary piston 86 would freely travel to its further most left-hand position, as viewing FIG. 1, and the driver would have to depress the pedal 70 a distance to compensate for this loss in travel. However, because the primary and secondary pistons 84 and 86 are connected together, the secondary piston 86 is prevented from this movement and relatively little loss of travel occurs in this type of failure. Any suitable mechanical connection between the primary and secondary pistons 84 and 86 may be used. For example, as schematically shown in FIG. 1, the right-hand end of the secondary piston 86 may include an outwardly extending flange that extends into a groove formed in an inner wall of the primary piston 84. The groove has a width which is greater than the width of the flange, thereby providing a relatively small amount of travel between the first and secondary pistons 84 and 86 relative to one another.

The brake pedal unit 14 may include an input spring 150 generally disposed between the input piston 82 and the primary piston 84. Additionally, the brake pedal unit 14 may include a primary spring (not shown) disposed between the primary piston 84 and the secondary piston 86. A secondary spring 152 may be included and disposed between the secondary piston 86 and a bottom wall of the bore 80. The input, primary and secondary springs may have any suitable configuration, such as a caged spring assembly, for biasing the pistons in a direction away from each other and also to properly position the pistons within the housing of the brake pedal unit 14.

The brake system 10 may further include a pressure sensor 156 in fluid communication with the conduit 36 to detect the pressure within the secondary pressure chamber 96 and for transmitting the signal indicative of the pressure to the ECU 22. Additionally, the brake system 10 may further include a pressure sensor 158 in fluid communication with the conduit 34 for transmitting a signal indicative of the pressure at the output of the plunger assembly 18.

Figure 2:
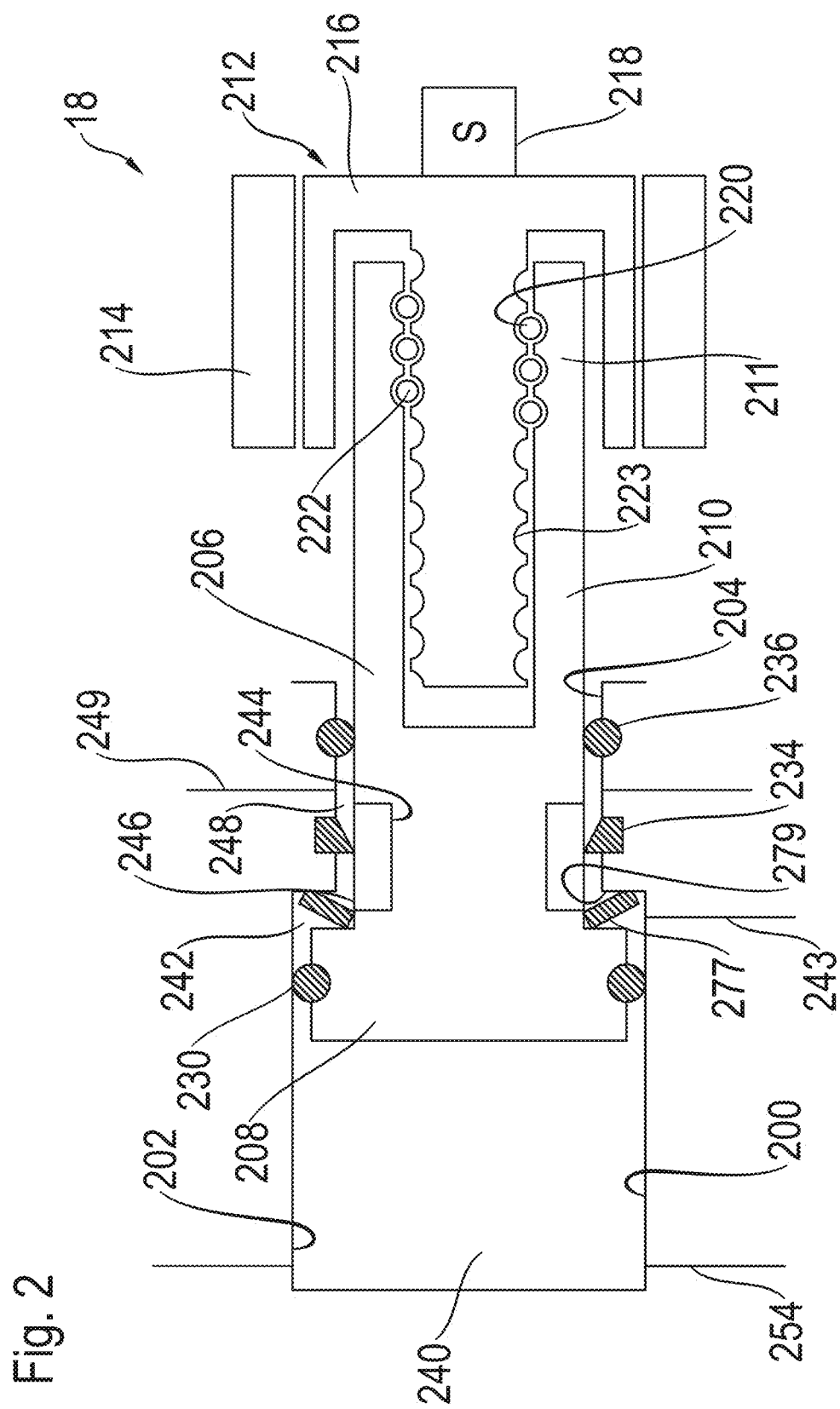
FIG. 2 is an enlarged schematic illustration of the plunger assembly of the brake system of FIG. 1.

As shown schematically in FIG. 2, the plunger assembly 18 includes a housing having a multi-stepped bore 200 formed therein. The bore 200 includes a first portion 202 and a second portion 204. A piston 206 is slidably disposed within the bore 200. The piston 206 includes an enlarged end portion 208 connected to a smaller diameter central portion 210. The piston 206 has a second end 211 connected to a ball screw mechanism, indicated generally at 212. The ball screw mechanism 212 is provided to impart translational or linear motion of the piston 206 along an axis defined by the bore 200 in both a forward direction (leftward as viewing FIGS. 1 and 2), and a rearward direction (rightward as viewing FIGS. 1 and 2) within the bore 200 of the housing. In the embodiment shown, the ball screw mechanism 212 includes a motor 214 rotatably driving a screw shaft 216. The second end 211 of the piston 206 includes a threaded bore 220 and functions as a driven nut of the ball screw mechanism 212. The ball screw mechanism 212 includes a plurality of balls 222 that are retained within helical raceways 223 formed in the screw shaft 216 and the threaded bore 220 of the piston 206 to reduce friction. Although a ball screw mechanism 212 is shown and described with respect to the plunger assembly 18, it should be understood that other suitable mechanical linear actuators may be used for imparting movement of the piston 206. It should also be understood that although the piston 206 functions as the nut of the ball screw mechanism 212, the piston 206 could be configured to function as a screw shaft of the ball screw mechanism 212. Of course, under this circumstance, the screw shaft 216 would be configured to function as a nut having internal helical raceways formed therein. The piston 206 may include structures (not shown) engaged with cooperating structures formed in the housing of the plunger assembly 18 to prevent rotation of the piston 206 as the screw shaft 216 rotates around the piston 206. For example, the piston 206 may include outwardly extending splines or tabs (not shown) that are disposed within longitudinally extending grooves (not shown) formed in the housing of the plunger assembly 18 such that the tabs slide along within the grooves as the piston 206 travels in the bore 200.

As will be discussed below, the plunger assembly 18 is preferably configured to provide pressure to the conduit 34 when the piston 206 is moved in both the forward and rearward directions. The plunger assembly 18 includes a seal 230 mounted on the enlarged end portion 208 of the piston 206. The seal 230 slidably engages with the inner cylindrical surface of the first portion 202 of the bore 200 as the piston 206 moves within the bore 200. A seal 234 and a seal 236 are mounted in grooves formed in the second portion 204 of the bore 200. The seals 234 and 236 slidably engage with the outer cylindrical surface of the central portion 210 of the piston 206. A first pressure chamber 240 is generally defined by the first portion 202 of the bore 200, the enlarged end portion 208 of the piston 206, and the seal 230. An annular shaped second pressure chamber 242, located generally behind the enlarged end portion 208 of the piston 206, is generally defined by the first and second portions 202 and 204 of the bore 200, the seals 230 and 234, and the central portion 210 of the piston 206. The seals 230, 234, and 236 can have any suitable seal structure.

Although the plunger assembly 18 may be configured to any suitable size and arrangement, in one embodiment, the effective hydraulic area of the first pressure chamber 240 is greater than the effective hydraulic area of the annular shaped second pressure chamber 242. The first pressure chamber 240 generally has an effective hydraulic area corresponding to the diameter of the central portion 210 of the piston 206 (the inner diameter of the seal 234) since fluid is diverted through the conduits 254, 34, and 243 as the piston 206 is advanced in the forward direction. The second pressure chamber 242 generally has an effective hydraulic area corresponding to the diameter of the first portion 202 of the bore 200 minus the diameter of the central portion 210 of the piston 206. This configuration provides that on the back stroke in which the piston 206 is moving rearwardly, less torque (or power) is required by the motor 214 to maintain the same pressure as in its forward stroke. Besides using less power, the motor 214 may also generate less heat during the rearward stroke of piston 206. Under circumstances in which the driver presses on the pedal 70 for long durations, the plunger assembly 18 could be operated to apply a rearward stroke of the piston 206 to prevent overheating of the motor 214.

The plunger assembly 18 preferably includes a sensor, schematically shown as 218, for detecting the position of the piston 206 within the bore 200. The sensor 218 is in communication with the ECU 22. In one embodiment, the sensor 218 may detect the position of the piston 206, or alternatively, metallic or magnetic elements embedded with the piston 206. In an alternate embodiment, the sensor 218 may detect the rotational position of the motor 214 and/or other portions of the ball screw mechanism 212 which is indicative of the position of the piston 206. The sensor 218 can be located at any desired position.

The piston 206 of the plunger assembly 18 includes a passageway 244 formed therein. The passageway 244 defines a first port 246 extending through the outer cylindrical wall of the piston 206 and is in fluid communication with the secondary chamber 242. The passageway 244 also defines a second port 248 extending through the outer cylindrical wall of the piston 206 and is in fluid communication with a portion of the bore 200 located between the seals 234 and 236. The second port 248 is in fluid communication with a conduit 249 which is in fluid communication with the reservoir 20 (T3). When in the rest position, as shown in FIG. 2, the pressure chambers 240 and 242 are in fluid communication with the reservoir 20 via the conduit 249. This helps in ensuring a proper release of pressure at the output of the plunger assembly 18 and within the pressure chambers 240 and 242 themselves. After an initial forward movement of the piston 206 from its rest position, the port 248 will move past the lip seal 234, thereby closing off fluid communication of the pressure chambers 240 and 242 from the reservoir 20, thereby permitting the pressure chambers 240 and 242 to build up pressure as the piston 206 moves further.

Referring back to FIG. 1, the brake system 10 further includes a first plunger valve 250, and a second plunger valve 252. The first plunger valve 250 is preferably a solenoid actuated normally closed valve. Thus, in the non-energized state, the first plunger valve 250 is in a closed position, as shown in FIG. 1. The second plunger valve 252 is preferably a solenoid actuated normally open valve. Thus, in the non-energized state, the second plunger valve 252 is in an open position, as shown in FIG. 1. A check valve may be arranged within the second plunger valve 252 so that when the second plunger valve 252 is in its closed position, fluid may still flow through the second plunger valve 252 in the direction from a first output conduit 254 (from the first pressure chamber 240 of the plunger assembly 18) to the conduit 34 leading to the isolation valves 30 and 32. Note that during a rearward stroke of the piston 206 of the plunger assembly 18, pressure may be generated in the second pressure chamber 242 for output into the conduit 34.

Generally, the first and second plunger valves 250 and 252 are controlled to permit fluid flow at the outputs of the plunger assembly 18 and to permit venting to the reservoir 20 (T3) through the plunger assembly 18 when so desired. For example, the first plunger valve 250 may be energized to its open position during a normal braking event so that both of the first and second plunger valves 250 and 252 are open (which may reduce noise during operation). Preferably, the first plunger valve 250 is almost always energized during an ignition cycle when the engine is running. Of course, the first plunger valve 250 may be purposely moved to its closed position such as during a pressure generating rearward stroke of the plunger assembly 18. The first and second plunger valves 250 and 252 are preferably in their open positions when the piston 206 of the plunger assembly 18 is operated in its forward stroke to maximize flow. When the driver releases the brake pedal 70, the first and second plunger valves 250 and 252 preferably remain in their open positions. Note that fluid can flow through the check valve within the closed second plunger valve 252, as well as through a check valve 258 from the reservoir 20 depending on the travel direction of the piston 206 of the plunger assembly 18.

It may be desirable to configure the first plunger valve 250 with a relatively large orifice therethrough when in its open position. A relatively large orifice of the first plunger assembly 250 helps to provide an easy flow path therethrough. The second plunger valve 252 may be provided with a much smaller orifice in its open position as compared to the first plunger valve 250. One reason for this is to help prevent the piston 206 of the plunger assembly 18 from rapidly being back driven upon a failed event due to the rushing of fluid through the first output conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 18 upon failure of the brake system 10, such as for example, when power is lost to the motor 214 and the pressure within the conduit 34 is relatively high. As shown in FIG. 2, the plunger assembly 18 may include an optional spring member, such as a spring washer 277, to assist in cushioning such a rapid rearward back drive of the piston 206. The spring washer 277 may also assist in cushioning the piston 206 moving at any such speed as it approaches a rest position near its most retracted position within the bore 200. Schematically shown in FIG. 2, the spring washer 277 is located between the enlarged end portion 208 and a shoulder 279 formed in the bore 200 between the first and second portions 202 and 204. The spring washer 277 can have any suitable configuration which deflects or compresses upon contact with the piston 206 as the piston 206 moves rearwardly. For example, the spring washer 277 may be in the form of a metal conical spring washer. Alternatively, the spring washer 277 may be in the form of a wave spring. Although the spring washer 277 is shown mounted within the bore 200 of the plunger assembly 18, the spring washer 277 may alternatively be mounted on the piston 206 such that the spring washer 277 moves with the piston 206. In this configuration, the spring washer 277 would engage with the shoulder 279 and compress upon sufficient rightward movement of the piston 206.

The first and second plunger valves 250 and 252 provide for an open parallel path between the pressure chambers 240 and 242 of the plunger assembly 18 during a normal braking operation. Although a single open path may be sufficient, the advantage of having both the first and second plunger valves 250 and 252 is that the first plunger valve 250 may provide for an easy flow path through the relatively large orifice thereof, while the second plunger valve 252 may provide for a restricted orifice path during certain failed conditions (when the first plunger valve 250 is de-energized to its closed position.

During a typical or normal braking operation, the brake pedal 70 is depressed by the driver of the vehicle. In a preferred embodiment of the brake system 10, the brake pedal unit 14 includes one or more travel sensors 270 (for redundancy) for producing signals transmitted to the ECU 22 that are indicative of the length of travel of the input piston 82 of the brake pedal unit 14.

During normal braking operations, the plunger assembly 18 is operated to provide pressure to the conduit 34 for actuation of the wheel brakes 12a, 12b, 12c, and 12d. Under certain driving conditions, the ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the brake pedal unit 14, generated by depression of the brake pedal 70, is diverted into the pedal simulator 16. The simulator valve 116 is actuated to divert fluid through the simulator valve 116 from the input chamber 92. Note that the simulator valve 116 is shown in its energized state in FIG. 1. Thus, the simulator valve 116 is a normally closed solenoid valve. Also note that fluid flow from the input chamber 92 to the reservoir 20 is closed off once the passageway 106 in the input piston 82 moves past the seal 104.

During the duration of a normal braking event, the simulator valve 116 remains open, preferably. Also during the normal braking operation, the isolation valves 30 and 32 are energized to secondary positions to prevent the flow of fluid from the conduits 36 and 38 through the isolation valves 30 and 32, respectively. Preferably, the isolation valves 30 and 32 are energized throughout the duration of an ignition cycle such as when the engine is running instead of being energized on and off to help minimize noise. Note that the primary and secondary pistons 84 and 86 are not in fluid communication with the reservoir 20 due to their passageways 136 and 144, respectively, being positioned past the lip seals 132 and 140, respectively. Prevention of fluid flow through the isolation valves 30 and 32 hydraulically locks the primary and secondary chambers 94 and 96 of the brake pedal unit 14 preventing further movement of the primary and secondary pistons 84 and 86.

It is generally desirable to maintain the isolation valves 30 and 32 energized during the normal braking mode to ensure venting of fluid to the reservoir 20 through the plunger assembly 18 such as during a release of the brake pedal 70 by the driver. As best shown in FIG. 1, the passageway 244 formed in the piston 206 of the plunger assembly 18 permits this ventilation.

During normal braking operations, while the pedal simulator 16 is being actuated by depression of the brake pedal 70, the plunger assembly 18 can be actuated by the ECU 22 to provide actuation of the wheel brakes 12a, 12b, 12c, and 12d. The plunger assembly 18 is operated to provide desired pressure levels to the wheel brakes 12a, 12b, 12c, and 12d compared to the pressure generated by the brake pedal unit 14 by the driver depressing the brake pedal 70. The electronic control unit 22 actuates the motor 214 to rotate the screw shaft 216 in the first rotational direction. Rotation of the screw shaft 216 in the first rotational direction causes the piston 206 to advance in the forward direction (leftward as viewing FIGS. 1 and 2). Movement of the piston 206 causes a pressure increase in the first pressure chamber 240 and fluid to flow out of the first pressure chamber 240 and into the conduit 254. Fluid can flow into the conduit 34 via the open first and second plunger valves 250 and 252. Note that fluid is permitted to flow into the second pressure chamber 242 via a conduit 243 as the piston 206 advances in the forward direction. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through open apply valves 50, 54, 58, and 62 while the dump valves 52, 56, 60, and 64 remain closed. When the driver lifts off or releases the brake pedal 70, the ECU 22 can operate the motor 214 to rotate the screw shaft 216 in the second rotational direction causing the piston 206 to retract withdrawing the fluid from the wheel brakes 12a, 12b, 12c, and 12d. The speed and distance of the retraction of the piston 206 is based on the demands of the driver releasing the brake pedal 70 as sensed by the sensor 218. Under certain conditions, the pressurized fluid from the wheel brakes 12a, 12b, 12c, and 12d may assist in back-driving the ball screw mechanism 212 moving the piston 206 back towards its rest position.

In some situations, the piston 206 of the plunger assembly 18 may reach its full stroke length within the bore 200 of the housing and additional boosted pressure is still desired to be delivered to the wheel brakes 12a, 12b, 12c, and 12d. The plunger assembly 18 is a dual acting plunger assembly such that it is configured to also provide boosted pressure to the conduit 34 when the piston 206 is stroked rearwardly (rightward) or in a reverse direction. This has the advantage over a conventional plunger assembly that first requires its piston to be brought back to its rest or retracted position before it can again advance the piston to create pressure within a single pressure chamber. If the piston 206 has reached its full stroke, for example, and additional boosted pressure is still desired, the second plunger valve 252 is energized to its closed check valve position. The first plunger valve 250 is de-energized to its closed position. The electronic control unit 22 actuates the motor 214 in a second rotational direction opposite the first rotational direction to rotate the screw shaft 216 in the second rotational direction. Rotation of the screw shaft 216 in the second rotational direction causes the piston 206 to retract or move in the rearward direction (rightward as viewing FIGS. 1 and 2). Movement of the piston 206 causes a pressure increase in the second pressure chamber 242 and fluid to flow out of the second pressure chamber 242 and into the conduit 243 and the conduit 34. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through the opened apply valves 50, 54, 58, and 62 while dump valves 52, 56, 60, and 64 remain closed. In a similar manner as during a forward stroke of the piston 206, the ECU 22 can also selectively actuate the apply valves 50, 54, 58, and 62 and the dump valves 52, 56, 60, and 64 to provide a desired pressure level to the wheel brakes 12a, 12b, 12c, and 12d, respectively. When the driver lifts off or releases the brake pedal 70 during a pressurized rearward stroke of the plunger assembly 18, the first and second plunger valves 250 and 252 are preferably operated to their open positions, although having only one of the valves 250 and 252 open would generally still be sufficient. Note that when transitioning out of a slip control event, the ideal situation would be to have the position of the piston 206 and the displaced volume within the plunger assembly 18 correlate exactly with the given pressures and fluid volumes within the wheel brakes 12a, 12b, 12c, and 12d. However, when the correlation is not exact, fluid can be drawn from the reservoir 20 via the check valve 258 into the chamber 240 of the plunger assembly 18.

During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the ECU 22 can operate the plunger assembly 18 to provide a source of pressurized fluid directed to the wheel brakes, such as during an autonomous vehicle braking event.

In the event of a loss of electrical power to portions of the brake system 10, the brake system 10 provides for manual push through or manual apply such that the brake pedal unit 14 can supply relatively high pressure fluid to the conduits 36 and 38. During an electrical failure, the motor 214 of the plunger assembly 18 might cease to operate, thereby failing to produce pressurized hydraulic brake fluid from the plunger assembly 18. The isolation valves 30 and 32 will shuttle (or remain) in their positions to permit fluid flow from the conduits 36 and 38 to the wheel brakes 12a, 12b, 12c, and 12d. The simulator valve 116 is shuttled to its closed position to prevent fluid from flowing out of the input chamber 92 to the pedal simulator 16. During the manual push-through apply, the input piston 82, the primary piston 84, and the secondary piston 86 will advance leftwardly such that the passageways 106, 136, 144 will move past the seals 102, 132, and 140, respectively, to prevent fluid flow from their respective fluid chambers 92, 94, and 96 to the reservoir 20, thereby pressurizing the chambers 92, 94, and 96. Fluid flows from the chambers 94 and 96 into the conduits 38 and 36, respectively, to actuate the wheel brakes 12a, 12b, 12c, and 12d.

Figure 3:
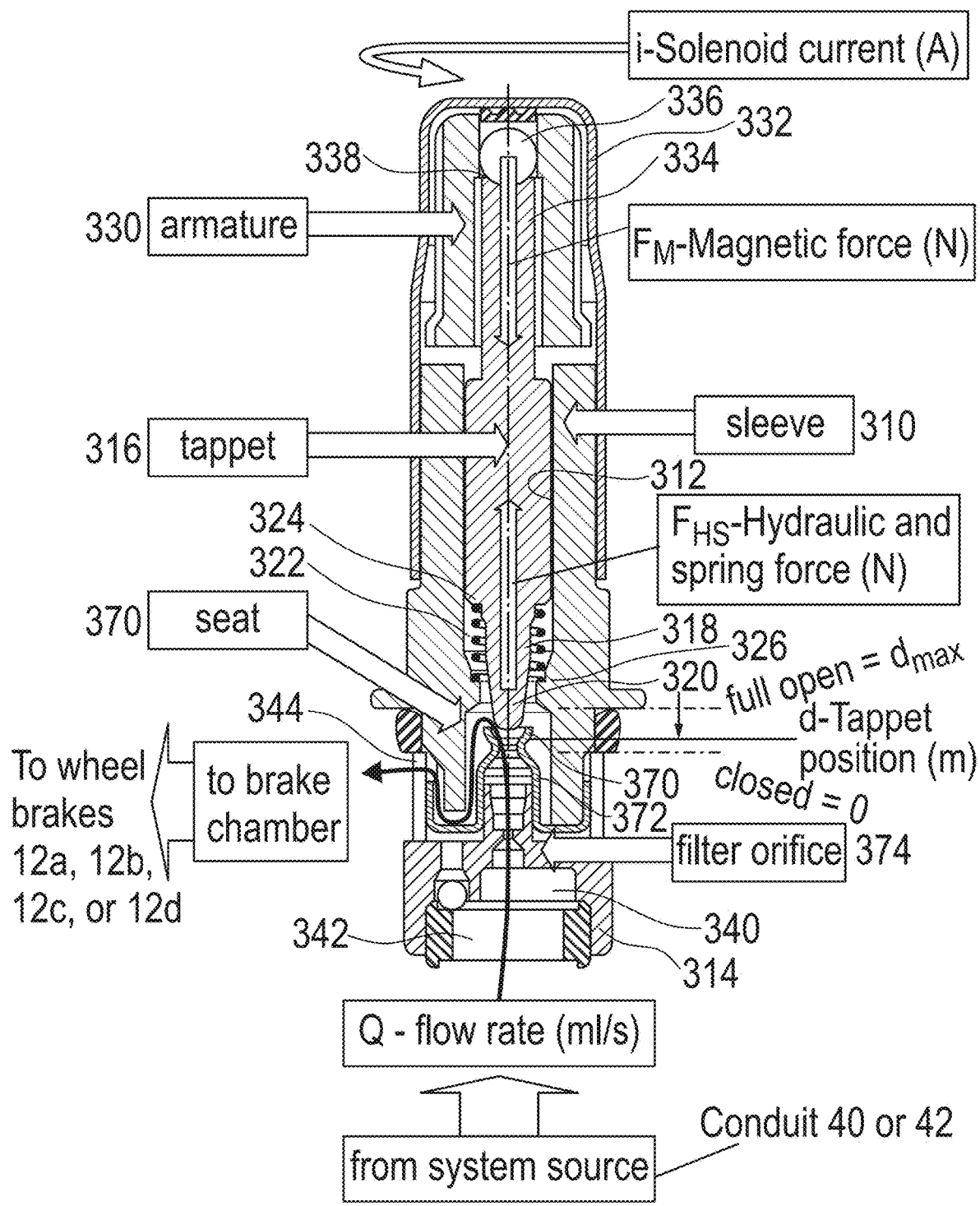
FIG. 3 is a cross-sectional view of a valve, such as an apply valve, which can be calibrated in accordance with the present disclosure.

The brake system 10 may also be used to calibrate various components of the brake system 10. For example, there is illustrated in FIG. 3 an example of an electromechanical solenoid actuated valve, indicated generally at 300, which may be used as an apply valve 50, 54, 58, and/or 62 of the brake system 10 shown and described with respect to FIG. 1. The term apply valve (for apply valves 50, 54, 58, and 62) is also known as an ABS isolation valve within the automotive braking industry. The ECU 22 of the brake system 10 may be configured to implement an algorithm to calibrate the valve 300 before or preferably after the valve 300 has been mounted and installed into the housing or block that contains the various components of the brake system 10. As will be discussed in detail below, the algorithm helps to improve wheel pressure accuracy by learning the current to pressure characteristic of each individual valve 300 (apply valves 50, 54, 58, and 62) and then adjusting the current directed to the valve 300 accordingly to provide a desired output. After this calibration, all four apply valves 50, 54, 58, and 62 can then be operated in a more uniform manner with respect to each other as compared to a set of four valves that have not been calibrated. This learning and valve control adjustment provides for a more robust and accurate slip control system to compensate for the slight part to part variation from one valve 300 to another. These slight variations may be caused by manufacturing tolerances during the manufacture and assembly of the various components which make up the valve 300. These slight variations may also be caused due to slight differences in the positional mounting of the valve components within the housing or block. Additionally, this learning and valve control adjustment may provide for easy integration of intentional hardware variations or changes which might occur during the lifetime of the vehicle.

Referring now to FIG. 3, the valve 300 is an example of a valve that is suitable to be calibrated with the algorithm in accordance with the present disclosure. It should be understood that the valve 300 is only an example of a valve structure suitable for calibration and that other solenoid actuated valve could suitably be appropriately calibrated. The valve 300 is designed to be housed within a block (not shown), such as an aluminum block, which includes various conduits and fluid passageways therein as well as housing other valves and components of the brake system 10. The valve 300 includes a stationary sleeve 310 having a cylindrical central bore 312 formed therein. The sleeve 310 is mounted within a valve body 314. The valve body 314 may be part of the block or may be a separate structure therefrom. A cylindrically shaped tappet 316 is slidably disposed within the central bore 312 of the sleeve 310. The tappet 316 includes a necked down lower portion 318, as viewing FIG. 3. The lower portion 318 includes a spherical end 320. The spherical end 320 may be formed on the lower portion 318, as shown in FIG. 3, or may alternatively be defined by a separate ball embedded onto the end of the lower portion 318. As will be explained in further detail below, the spherical end 320 cooperates with a valve seat 370 for controlling the flow of fluid through the valve 300. The tappet 316 is biased upwardly by a coil spring 322. An upper end of the spring 322 engages with a shoulder 324 formed on the lower portion 318 of the tappet 316. The lower end of the coil spring 322 engages with an internal shoulder 326 formed within the central bore 312 of the sleeve 310.

The valve 300 further includes a tubular armature 330 mounted above the sleeve 310, as viewing FIG. 3, by a cup shaped thin walled cover 332. The armature 330 is movably mounted within the cover 332 and is movable in a vertical direction relative to the sleeve 310. The armature 330 engages with an upper portion 334 of the tappet 316 via a ball 336 in contact with an upper end 338 of the tappet 316. The armature 330 is surrounded by electrical coils (not shown) defining, in part, the solenoid portion of the valve 300.

The valve body 314 includes a multi-stepped bore 340 formed therethrough to permit the flow of fluid through the valve 300. The lower portion of the bore 340 defines a passageway 342 which is in fluid communication with either the conduit 40 or 42, as shown in FIG. 1. The conduits 40 and 42 are in fluid communication with the three way isolation valves 30 and 32, respectively. The upper portion of the bore 340 of the valve body 314 defines lateral passageways 344 (or passageway). The passageways 344 are in fluid communication with one of the conduits 350, 354, 358 or 362, as shown in FIG. 1. The conduits 350, 354, 358 and 362 lead to the brake chambers of wheel brakes 12a, 12b, 12c, and 12d, respectively.

Figure 4:
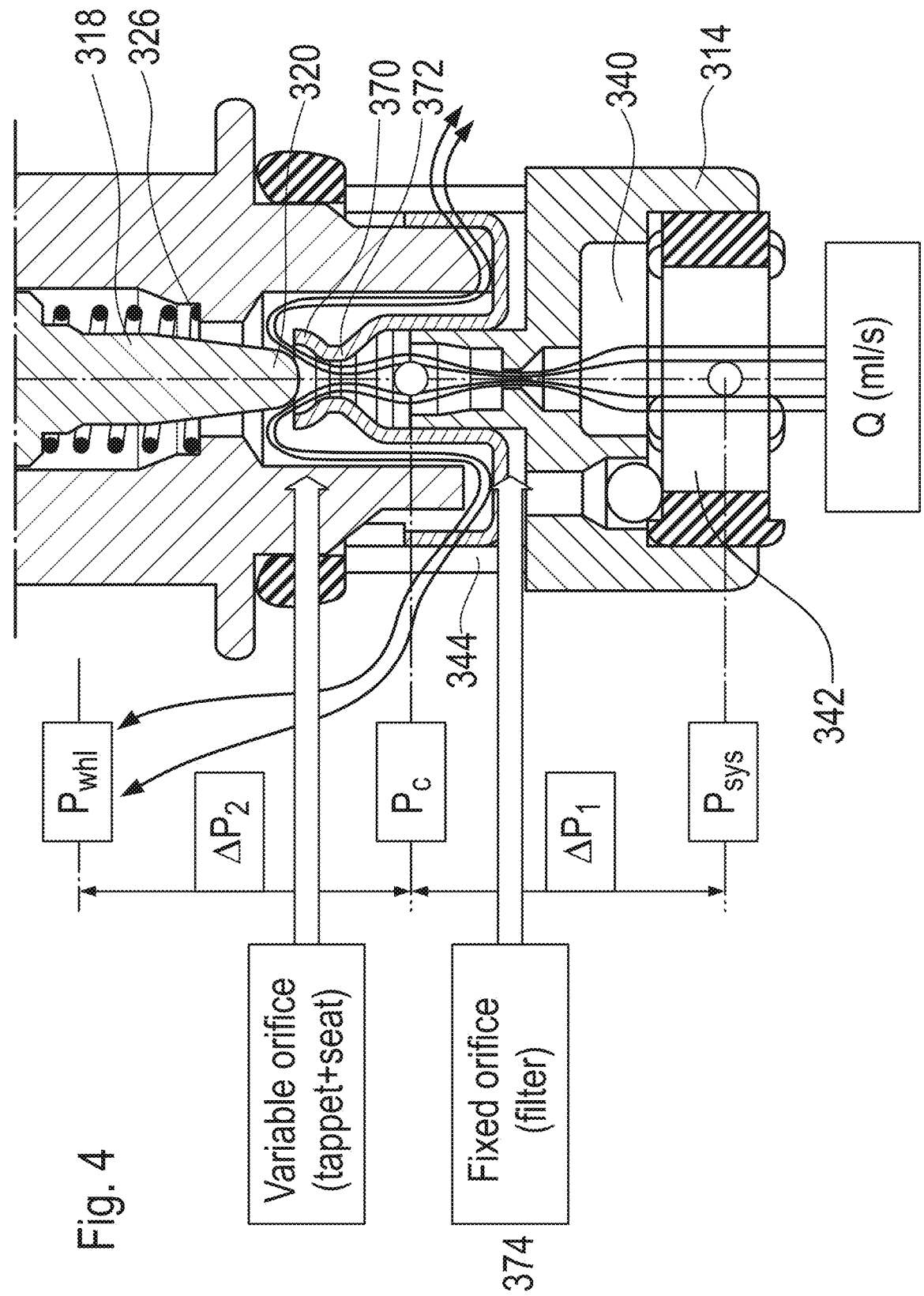
FIG. 4 is an enlarged cross-section of a portion of the valve of FIG. 3.

As shown in FIGS. 3 and 4, mounted within the valve body 314 is a stationary valve seat 370. The valve seat 370 is located adjacent to, but spaced from, the spherical end 320 of the lower portion 318 of the tappet 316. The valve seat 370 may have a corresponding spherical shape complimentary to the spherical shape of the spherical end 320 of the tappet 316. In the embodiment shown in FIGS. 3 and 4, the valve seat 370 may be formed on a stamped hollow body 372 fixedly mounted between the sleeve 310 and the valve body 314. Of course, the valve seat 370 may be formed by any suitable manner and may be integrally formed in the valve body 314. The valve body 314 may also include a filter orifice 374 therein which defines a fixed orifice through which fluid flows. The positional relationship of the spherical end 320 and the valve seat 370 define a variable orifice, as will be explained below.

The operation of the solenoid actuated valve 300 will now be discussed. The flow rate through the valve 300 can be altered by controlling the positional relationship between the spherical end 320 of the movable tappet 316 relative to the fixed valve seat 370. This positional relationship defines a variable orifice and changes the area or volume of the gap through which fluid flows through the valve 300. The valve 300 is configured as a normally open valve such that in the absence of electrical current being sent to the valve 300 (deenergized state), the spherical end 320 is spaced from the valve seat 370. Thus, fluid is permitted to flow between the passageways 340 and 342. If the valve 300 were used for one of the apply valves, such as the apply valve 54, fluid is free to flow through the valve 54 between the wheel brake 12b and the three way isolation valve 30 when the valve 54 is in the deenergized state.

To energize the valve 300, an electrical current is directed through the coils (not shown in FIGS. 3 and 4) surrounding the armature 330. The electric current through the coils creates a magnetic field. The magnetic field exerts a force on the armature 330 drawing the armature 330 downwardly, as viewing FIG. 3. Downward movement of the armature 330 causes the ball 336 to exert a force on the upper end 338 of the tappet 316, thereby driving the tappet 316 downwardly as well. The tappet 316 is slidably mounted within the central bore 312 of the sleeve 310. This downward movement of the tappet 316 acts against the bias of the spring 322 and compresses the spring 322. With sufficient applied current, the tappet 316 will move downward until the spherical end 320 fully seats on the valve seat 370, thereby closing off fluid communication between the passageways 342 and 344. As stated above, the flow rate through the valve 300 can be altered by controlling the positional relationship (gap) between the spherical end 320 relative to the valve seat 370. This is controlled by varying the applied current (I in Amps) to the coils to alter the gap through which fluid flows through the valve 300.

The behavior of the valve 300 is influenced by various forces acting on the components of the valve 300. These forces include magnetic forces, hydraulic forces, spring forces, and damping forces. Referring to FIG. 3, one of the forces that influence the behavior of the valve 300 is the magnetic force $F_M$ acting on the tappet 316 via the armature 330 and the ball 336. The magnetic force $F_M$ is a function of the applied current and the position of the tappet 316. Opposed to the magnetic force $F_M$ is a combination of a hydraulic and a spring force $F_{HS}$ acting on the tappet 316. The hydraulic force is a function of the fluid pressure acting on the tappet 316 both in a static form (applied delta pressure) and a dynamic form from the effects of flow rate (Bernoulli principle) as well as the fluid viscosity as a function of the fluid temperature. The spring force is generated from the compressive forces of the coil spring 322 and is a factor the spring's fixed and static spring rate characteristics. The behavior of the valve 300 is also influenced by damping forces such as frictional forces, motional movement, and hysteresis (a lag in reaction to a force).

Figure 5:
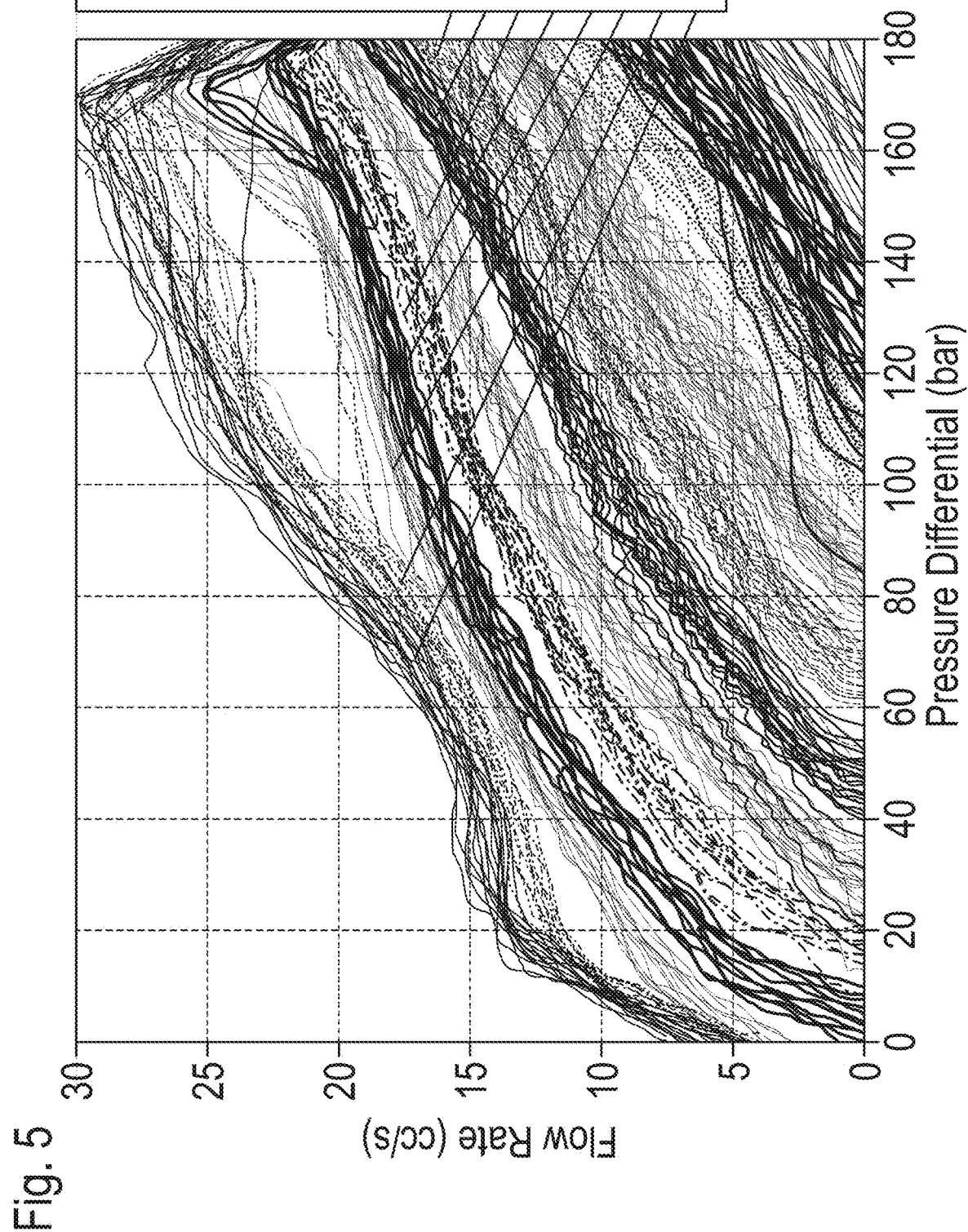
FIG. 5 is a graphical representation of a valve behavior illustrating that required current sent to the valve is a non-linear function of differential pressure and flow rate.
Figure 6:
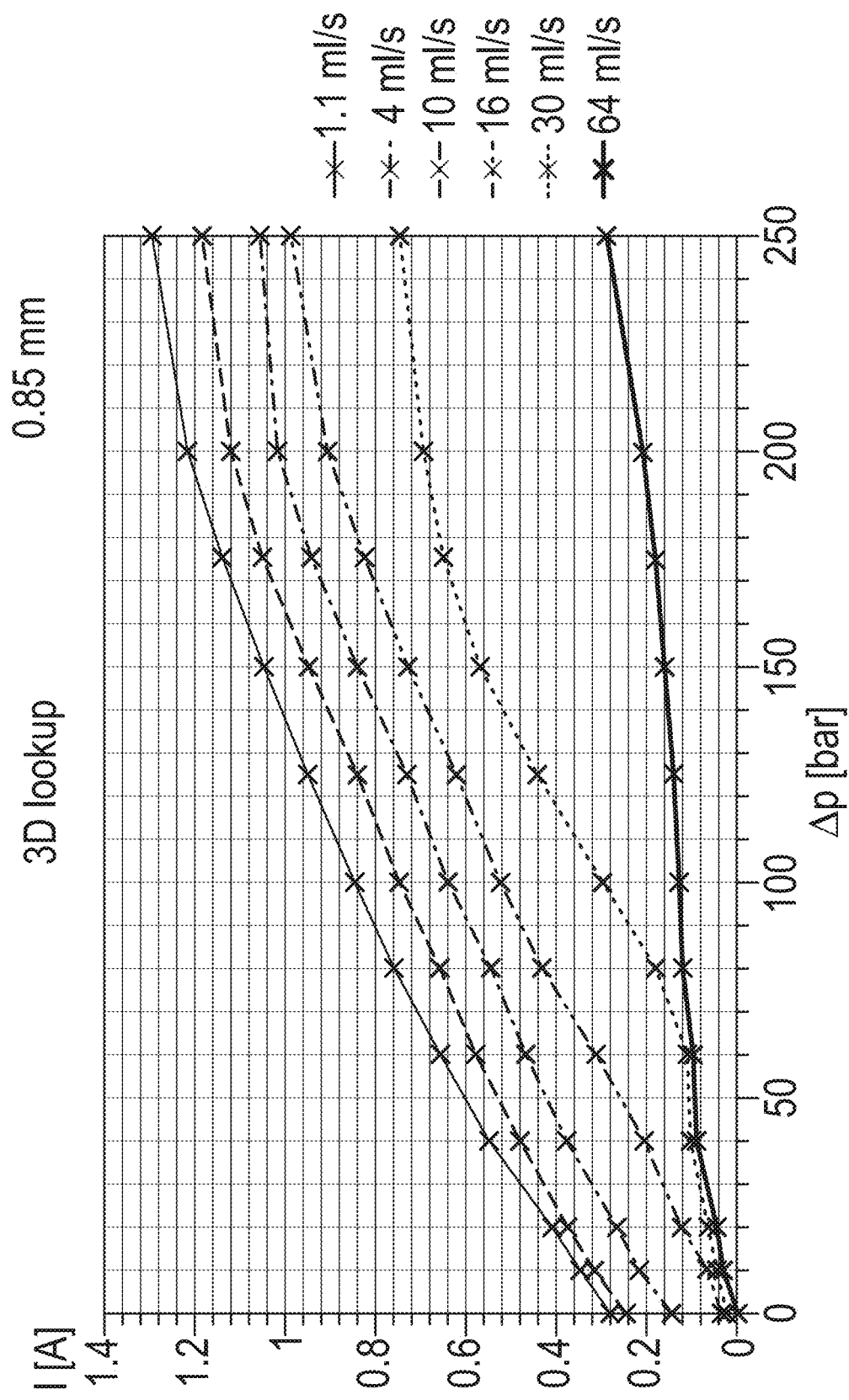
FIG. 6 is a graphical representation of a 3D lookup table of current vs. delta pressure for various fluid flow through the valve.

Due to the influence of the forces described above, the required current for operating the valve 300 is a non-linear function of differential pressure and fluid flow rate. There is illustrated in FIG. 5 an example of a graphical representation or look up table of the behavior of the valve 300. The graph includes various currents (from 0 amps to 1.7 amps) plotted relative to fluid flow rate in the vertical axis (Y) measured in cc/s and differential pressure measured in bar along the horizontal axis (X). This graphical representation illustrates that the applied current required for a given flow rate requires a non-linear application. To control and calibrate the valve 300 in this non-linear manner, it is generally not desirable to adjust every point within the look up table of FIG. 5. This would require a highly undesirable effort to obtain. Therefore, during the calibration process an assumption is made that a potential offset and gain error is applied in the same manner to all flow rates. As shown in FIG. 6, a relatively low flow of about 4.0 ml/s is selected to accomplish the calibration process due to its desirable characteristics. Note that a very low flow, such as about 1.1 ml/s, is too slow to reach gain pressure level so this low value is not used in the calibration process.

Figure 7:
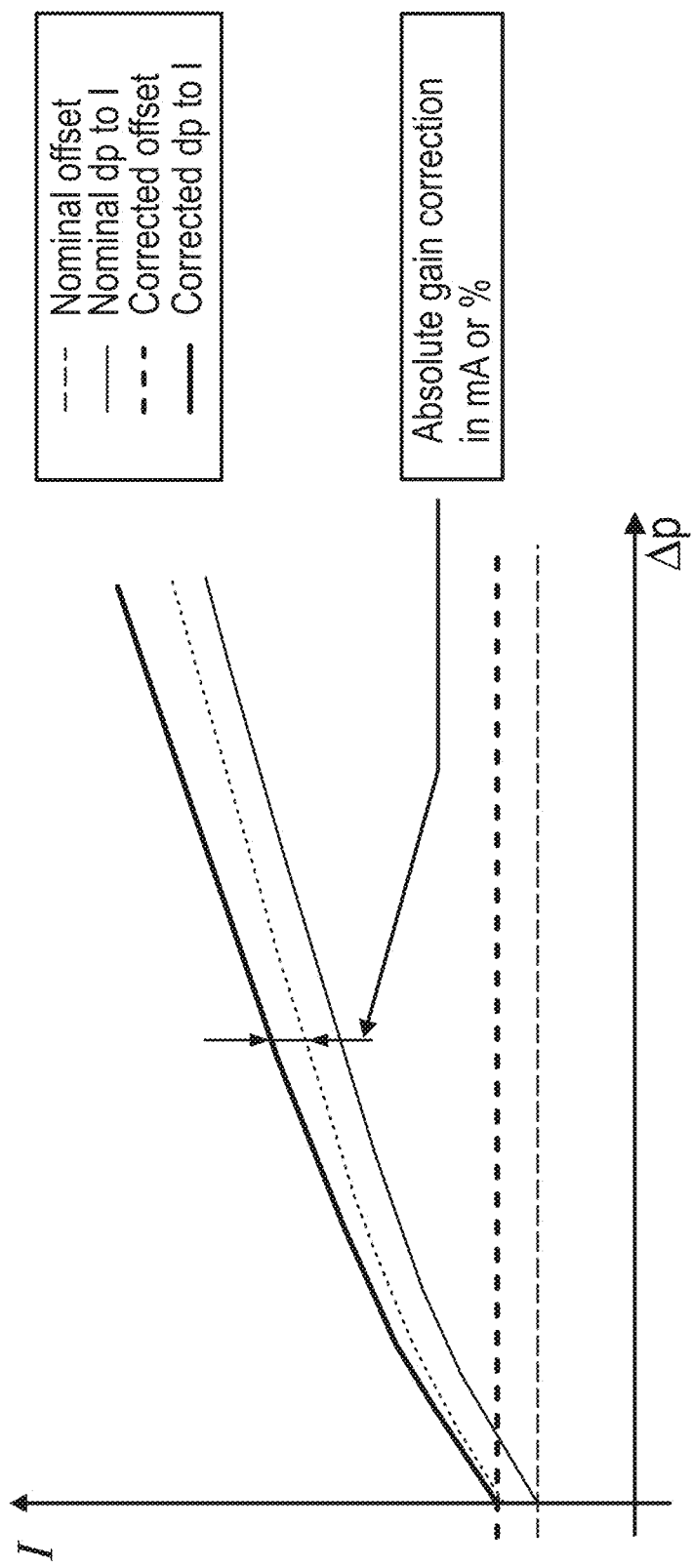
FIG. 7 is a graphical representation of offset and gain corrections.

The calibration process is generally divided into a reference phase, an offset learning phase, and a gain learning phase. The calibration process preferably includes determining both an offset correction and a gain factor for a specific flow rate. The offset and gain corrections are then applied to all data points (all flow rates) of the table. The graphical representation of FIG. 7 illustrates this calibration process. With respect to the offset correction, the complete characteristic is shifted by the correction value determined by the equation ($I_{NOMINAL} \pm I_{CORRECTED}$ [mA]), as shown in FIG. 7. With respect to the gain correction, a percentage of the nominal current is added to all data points determined by the equation ($I_{NOMINAL}(\Delta p) \pm f_{CORRECTED}$ [%]*$\Delta p$).

Figure 8:
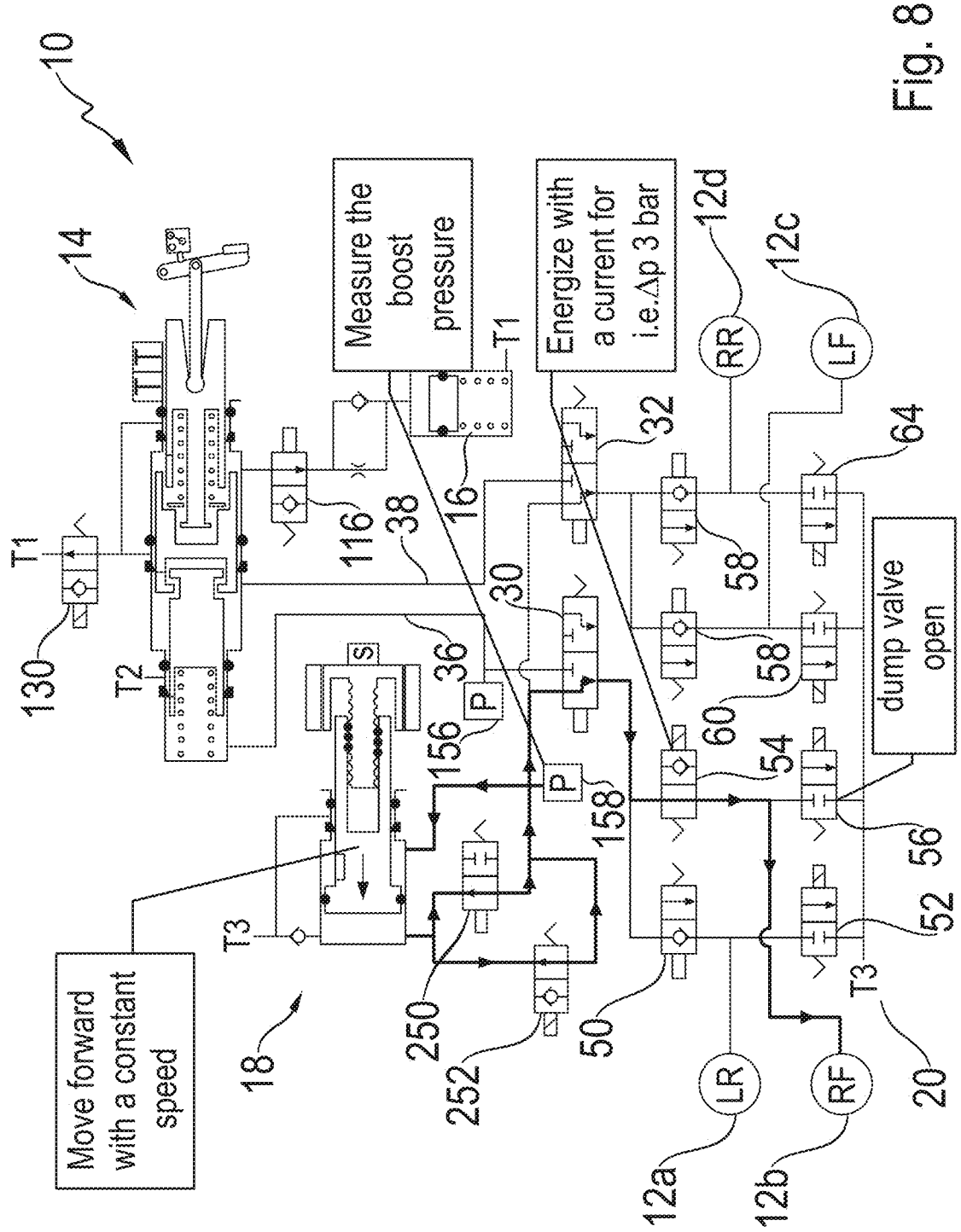
FIG. 8 is a schematic illustration of the brake system shown in FIG. 1, wherein various components of the brake system are shown in operated positions for calibration of a valve.

Referring now to FIG. 8, the calibration process will be described with respect to operation of the brake system 10. The brake system 10 illustrated in FIG. 8 is nearly identical to the brake system 10 illustrated in FIG. 1 and for these explanatory purposes will be considered the same brake system even if slight variations exist in the illustrated embodiments. For this example, the calibration process will be described and shown with respect to the apply valve 54 which corresponds to the wheel brake 12*b*. Calibration of the other apply valves 50, 58 and 62 can be handled in a similar manner and, therefore, will not be described in duplication herein. It is noted that the inclusion of the plunger assembly 18 and its ability to supply a constant flow within the brake system 10 makes the brake system 10 ideally suited for the calibration process.

Prior to calibration, the brake system 10 preferably is configured such that the three-way isolation valves 30 and 32 are moved to their energized positions, as shown in FIG. 8. This prevents the flow of fluid from the brake pedal unit 14 via the conduits 36 and 38 from flowing through the three-way isolation valves 30 and 32. Additionally, this permits the flow of fluid from the outlet of the plunger assembly 18 to flow through the three-way isolation valve 30 to the apply valve 54. Also, prior to the calibration process, the simulator valve 116 should be energized to its open position, as shown in FIG. 8, to permit the flow of fluid from the brake pedal unit 14 to the pedal simulator 16 should the brake pedal unit 14 be operated during the calibration process. Additionally, the remaining three apply valves 50, 58, and 62 should be energized to their fully closed positions, as shown in FIG. 8, such that all of the fluid from outlet of the plunger assembly 18 is directed through the apply valve 54.

During the reference phase of the calibration process, the plunger assembly 18 is operated to provide a constant flow of fluid to the apply valve 54. The dump valve 56 associated with the wheel brake 12*b* should be operated to its open position. Note that the dump valve 56 is not shown schematically in its open position in FIG. 8. Opening of the dump valve 56 provides a relatively low constant stiffness during the process and minimum back pressure is generated since the fluid is permitted to freely flow to the reservoir 20 (tank T3).

To initiate the calibration process for the apply valve 54 the plunger assembly 18 is operated to provide a constant flow of fluid to the apply valve 54. As discussed above with respect to the operation of the plunger assembly 18, the first plunger valve 250 should be energized to its open position, as shown in FIG. 8. The second plunger valve 252 should remain in its open position.

When it is desired to initiate the calibration process, the ECU 22 controls the piston within the plunger assembly 18 at a constant forward speed to provide a constant output flow. For example, a flow of about 4.0 ml/s delivered to the apply valve 54 has been found to be sufficient. The ECU 22 then energizes the solenoid of the apply valve 54 at a constant current, such as for example, that to achieve a pressure of about 3 bar. The applied boost pressure is then measured via the pressure sensor 158. The applied current to the apply valve 54 is adjusted until the required target pressure across the apply valve 54 is acquired. Once the applied current has been adjusted to achieve the target pressure, the applied current with the appropriate offset and gain corrections, as discussed above, are stored in non-volatile RAM.

Figure 9:
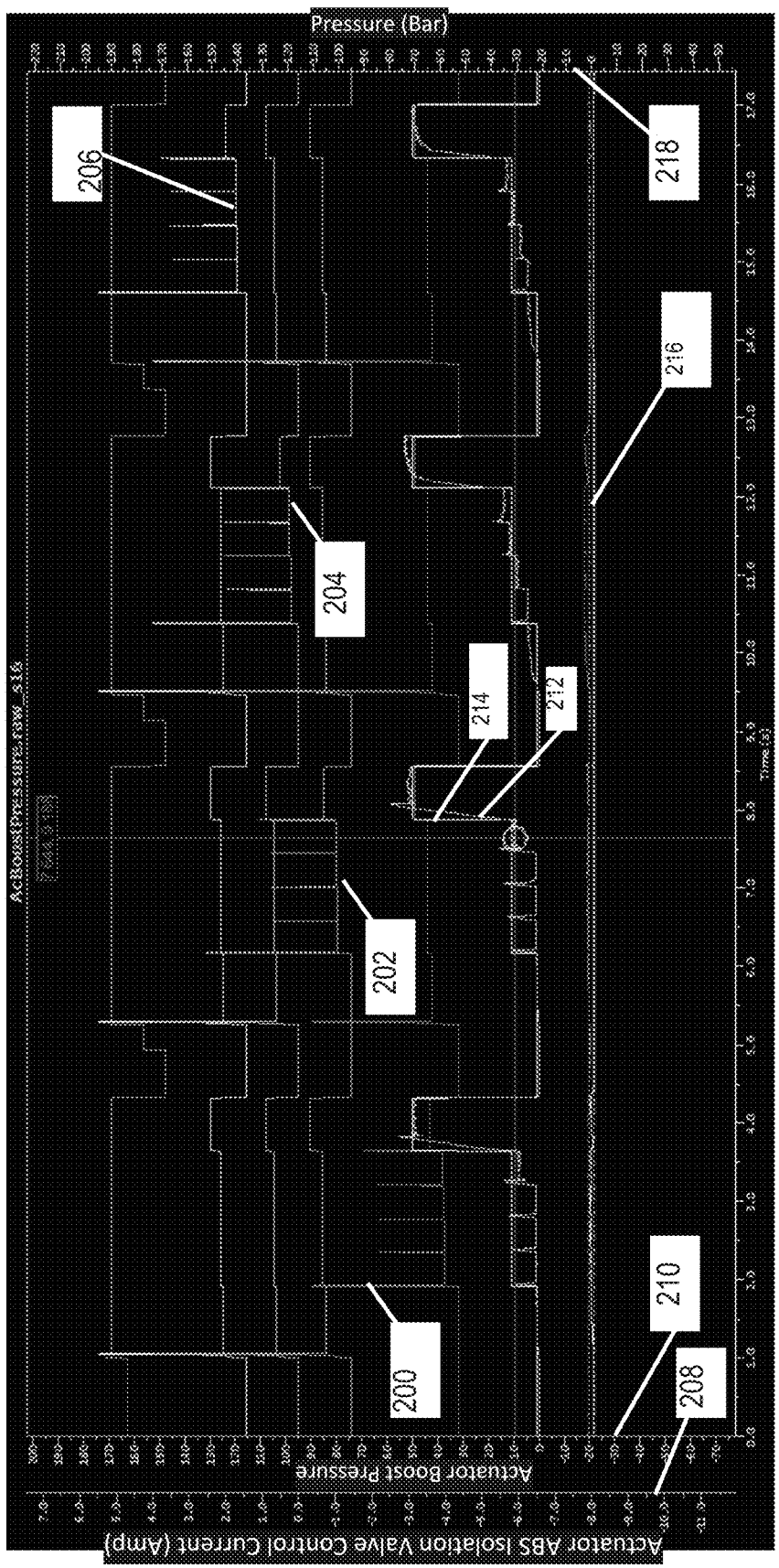
FIG. 9 is a graphical representation of an example of a calibration learning sequence.

FIG. 9 is an example of a learning sequence (APC=Adaptive Pressure Calibration) relative to time along the horizontal axis. As shown, boost pressure is generated during the calibration process. A pressure of 10 bar may be suitably used for an offset calibration target. A pressure of about 50 bar may be suitably used for a gain calibration target. Note that the calibration pressure target is trimmable. Preferably each calibration for the apply valves 50, 54, 58, and 62 include one reference sequence, 4 offset calibration sequences, and one gain calibration sequence. Preferably, each calibration sequence consists of states that have trimmable timing. Preferably, a time of about 1 second is generated between each valve calibration. FIG. 9 illustrates the calibration for four anti-lock braking system isolation ("ABSISO") valve. Each valve calibration being consistent of several sequences. For example, ABSISO0 valve calibration curve (element 200) is between 0 seconds and 4.5 seconds. ABSISO1 valve calibration curve (element 202) is between 4.5 seconds and 9 seconds. ABSISO2 valve calibration curve (element 204) is between 9 seconds and 13.5 seconds. ABSISO3 valve calibration curve (element 206) is between 13.5 seconds and 17.5 seconds.

In FIG. 9, the y-axis (element 208) on the far left is the current (in Amps) to the ABSISO valve. This is the current which is used to command a particular ABSISO valve. In the first ABSISO0 valve calibration, it shows current step through different level until the target boost pressure is achieved. The y-axis (element 210) which is second from the far left illustrates the boost pressure which is achieved (in Bar). Target boost pressure curve (element 212) is also shown. Target boost pressure curve (element 212) and boost pressure achieved curve (element 214) are on the same scale to show that the calibration is done when the measurement of the "boost pressure achieved" is aligned with the "target boost pressure." By comparison the two aforementioned curves, it can be determined whether the correct current offset is achieved and gain value can be determined. With respect to the y-axis (element 218) on the far right side of FIG. 9, the measurements for the wheel pressure (wheel pressure curve—element 216) at the wheels may be shown (in Bar). The wheel pressure curve 216 is shown at the bottom of the graph of FIG. 9 which demonstrates that wheel pressure is minimum and not be perceived by the driver.

The calibration process for each of the apply valves 50, 54, 58, and 62, as described above, can be run at any appropriate time of the life of the brake system 10. Preferably, a calibration process is initially run at the plant or manufacturing facility after assembly of the vehicle in which the brake system 10 is installed. Additionally, periodic or maintenance calibrations could also be run based on an ignition count which are preferably run while the vehicle is in a shutdown phase. Of course, diagnostic service at any time can run a calibration process such as when work is done on the brake system 10 during the life of the vehicle.

With respect to a calibration process run at the assembly plant, the vehicle is preferably at a standstill when this calibration process is run. While the vehicle is at a standstill, the plant calibration process should attempt to calibrate as often as necessary to complete for each ignition cycle. An example would be for a maximum of 4 total each with a maximum of 2 per valve. Additionally, the calibration process at the plant should not run in an indefinite mode, for example a maximum of 50 ignition cycles. Also, the calibration process at the plant should not run while a tester is connected to the vehicle.

Figure 10:
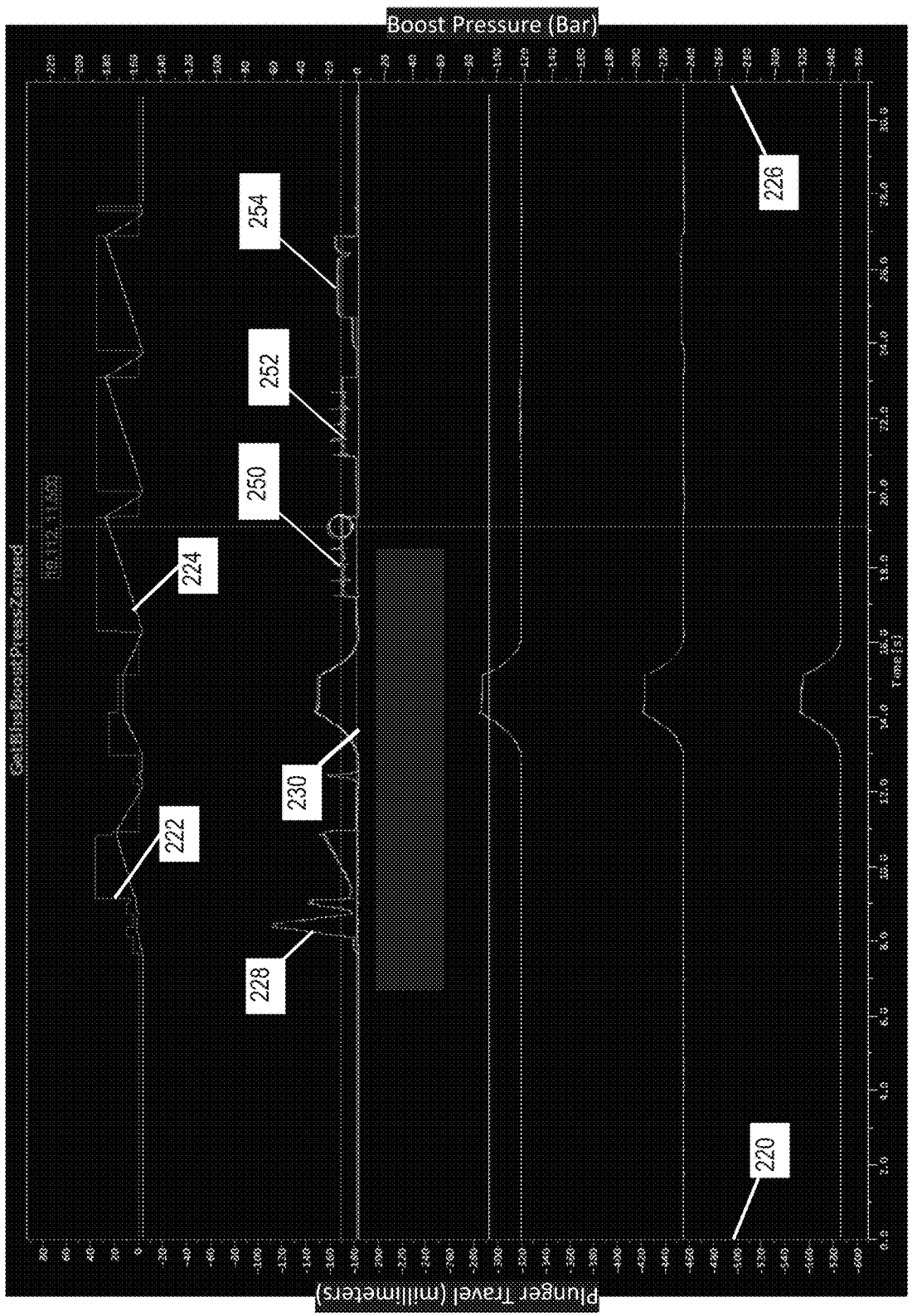
FIG. 10 is a graphical representation of an example of command and sensor readings during a calibration process being run at a manufacturing plant after initial installation of the brake system within a vehicle.

FIG. 10 is a graphical representation of an example of command and sensor readings during a calibration process being run at a manufacturing plant after initial installation of the brake system within a vehicle. Preferably, this calibration process will calibrate as many of the apply valves as possible within an allowed shutdown test time. When the shutdown test expires, the calibration process could abort and save the appropriate information in non-volatile RAM. As shown in FIG. 10, the First ABSISO0 valve calibration (shown as element 250) starts at 16.5 seconds, then the calibrations for ABSISO1 (shown as element 252) and ABSISO2 (shown as element 254) respectively are completed. However, as shown in FIG. 10, ABSISO3 calibration curve started but did not finish because it ran out of the time allotted for the shutdown test. APC(Calibration) is part of the shutdown test. The Y-Axis (element 220) on the left side of FIG. 10 measures the "plunger travel target curve" shown as element 222 (in mm) relative to the "actual plunger travel curve" shown as element 224 (also in mm). The Y-axis (element 226) on the right side of FIG. 10 is used to measure the "boost pressure achieved" curve shown as element 228 (in Bar) (white curve) relative to the "target boost pressure" curve shown as element 230 (blue curve).

Figure 11:
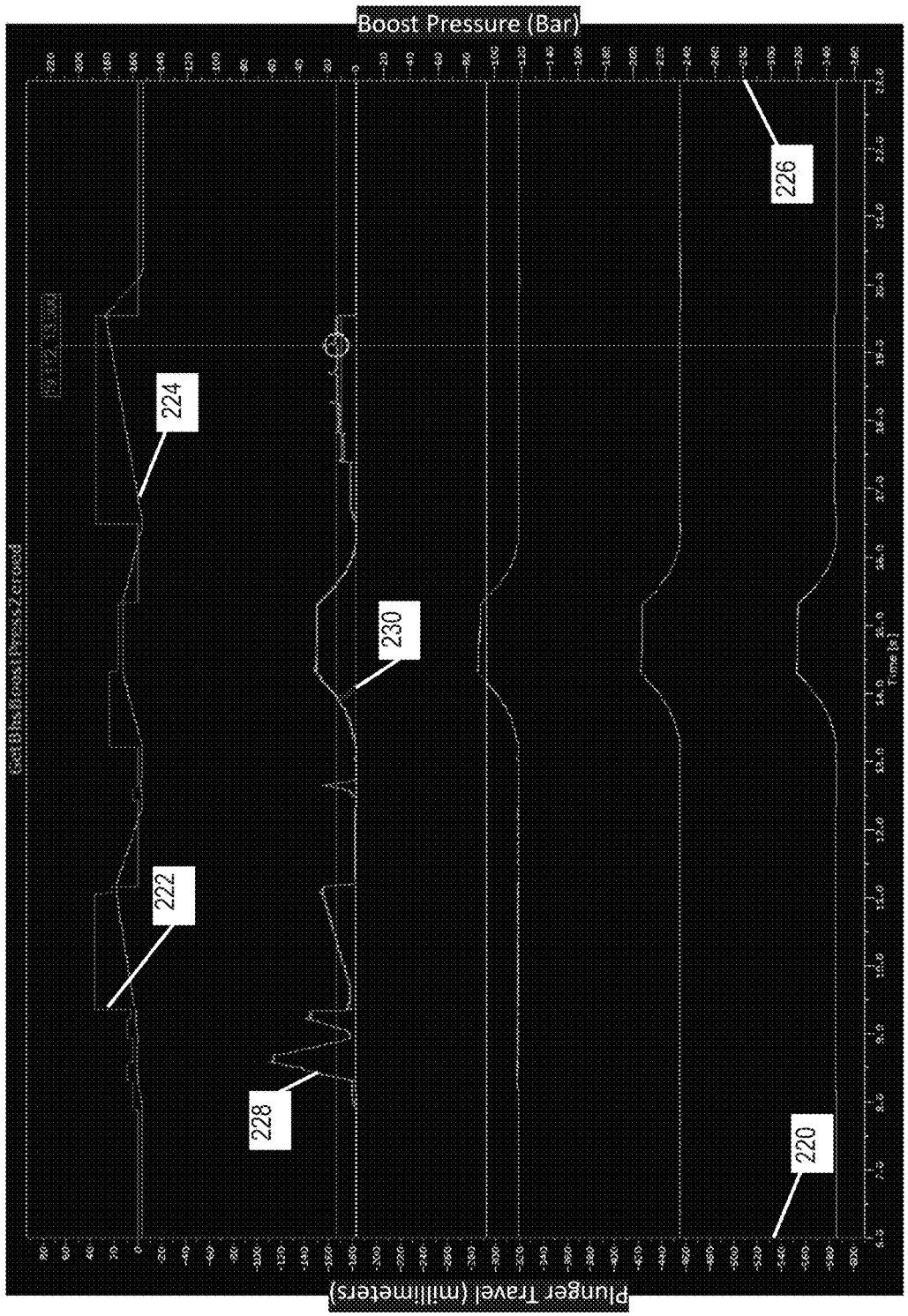
FIG. 11 is a graphical representation of another example of command and sensor readings during a calibration process being run at a manufacturing plant.

FIG. 11 illustrates another example of a plant learning calibration process after a next ignition cycle wherein the calibration is performed on a non-calibrated valve. FIG. 11 illustrates only one ABSISO valve calibration between 16.5 seconds. This is a continuous test from a previous ignition cycle because, in the previous ignition cycle, data was gathered for only 3 out of the 4 ABSISO valves. The Y-Axis 220 on the left side of FIG. 11 measures the "plunger travel target curve" shown as element 222 (in mm) relative to the "actual plunger travel curve" shown as element 224 (also in mm). The Y-axis 226 on the right side of FIG. 11 is used to measure the "boost pressure achieved" curve shown as element 228 (in Bar) relative to the "target boost pressure" curve" shown as element 230.

Figure 12:
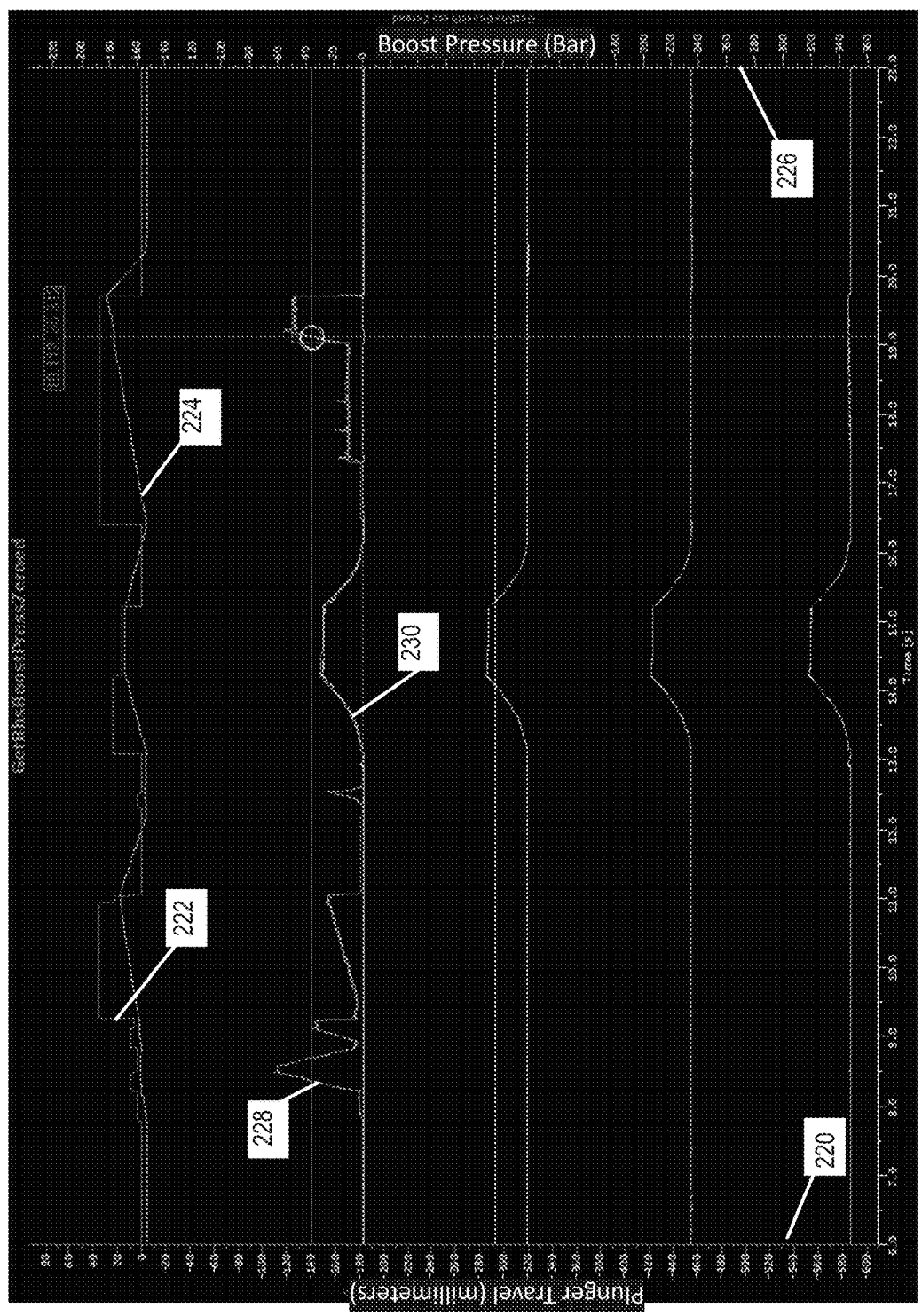
FIG. 12 is a graphical representation of an example of command and sensor readings during a calibration process being run periodically during a maintenance procedure.

With respect to a calibration process performed in a periodic or maintenance time period, it is also preferred that this calibration be run while the vehicle is at a standstill. This calibration process may be run at vehicle shutdown but preferably is performed for a limited time period, such as no longer than about 20 seconds. This calibration process can be done after a normal post run test and a static leakage test of the brake system 10. Due to time constraints, the calibration process may run one valve calibration per ignition cycle. FIG. 12 is a graphical representation of an example of command and sensor readings during a calibration process being run periodically during a maintenance procedure.

It is preferred that the calibration process be executed once at the beginning of the vehicle life for each of the apply valves 50, 54, 58, and 62 during a hydraulic shutdown test of the brake system 10. After this has been successfully completed the calibration protocol should switch to maintenance mode or periodic mode. Maintenance mode can then run during a vehicle shut down hydraulic test phase. For example, the maintenance calibration process could run after every 500 ignition counts. A single calibration process could be run on one apply valve per ignition cycle spread out over four ignition cycles. The time of each valve calibration should not exceed a limited amount of time, such as about 5 seconds so as not to burden or inadvertently alert the vehicle owner of a non-problem. With a small wait time between valve calibrations, the total calibration time should not exceed 20 seconds+/−4 seconds. Of course, the actual calibration time is valve offset and gain correction dependent. If a valve calibration is interrupted, the process should be repeated for that particular valve in the next ignition cycle until the valve is successfully calibrated.

Referring now to FIG. 12, only one ABSISO valve calibration is performed which starts at 17 seconds. APC Maintenance learn is scheduled throughout the vehicle life. The Y-Axis 220 on the left side of FIG. 12 measures the "plunger travel target curve" shown as element 222 (in mm) relative to the "actual plunger travel curve" shown as element 224 (also in mm). The Y-axis on the right side of FIG. 10 is used to measure the "boost pressure achieved" curve shown as element 228 (in Bar) relative to the "target boost pressure" curve" shown as element 230.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this present disclosure have been explained and illustrated in its preferred embodiment. However, it must be understood that this present disclosure may be practiced otherwise than as specifically explained and illustrated without departing from its spirit or scope.

What is claimed is:

1. A method of calibrating a solenoid actuated valve within a brake system comprising:
    (a) providing a brake system including a fluid pressure source;
    (b) providing a valve having a solenoid for producing a magnetic field, and wherein the valve is in fluid communication with the fluid pressure source;

(c) operating the fluid pressure source to provide a constant flow of fluid to the valve;
(d) energizing the solenoid of the valve with a constant current such that fluid flows through the valve;
(e) measuring the pressure of the fluid flowing at the valve;
(f) adjusting the current sent to the solenoid until a predetermined pressure has been obtained;
(g) storing a nominal current value of the current required to obtain the predetermined pressure; and
(h) calibrating the valve by adding a correction offset factor to the nominal current value for future actuation of the solenoid of the valve, wherein adding the correction offset factor to the nominal current value does not change the direction of the magnetic field and wherein the nominal current value is configured to cause the solenoid to move towards an open position and the correction offset factor is configured to cause the solenoid to move further towards the open position.

2. The method of claim 1, further calibrating the valve to add a correction gain factor by adding a percentage of the nominal current to all data points of future actuation of the solenoid valve.

3. The method of claim 1, wherein the method of calibrating the valve is performed after initial assembly of the valve and installation into the brake system, and wherein periodic calibrations of the valve are performed during the life of the brake system.

4. The method of claim 1, wherein in step (e), the pressure of the fluid is measured by a pressure sensor of a brake sensor located in a conduit between the fluid pressure source and the valve.

5. The method of claim 1, wherein the fluid pressure source is a plunger assembly.

6. The method of claim 5, wherein the plunger assembly has a housing defining a bore therein, wherein the plunger assembly includes a piston slidably disposed in the bore for pressurizing fluid within a pressure chamber when the piston is moved in a first direction, and wherein the plunger assembly further includes an electrically operated linear actuator for moving the piston within the bore.

7. The method of claim 1, wherein steps (c) through (h) are performed while a vehicle including the brake system is at a standstill.

8. A method of calibrating a solenoid actuated valve within a brake system comprising:
(a) providing a brake system including a fluid pressure source;
(b) providing a valve having a solenoid for producing a magnetic field, and wherein the valve is in fluid communication with the fluid pressure source;
(c) storing nominal values of currents required to be applied to the solenoid of the valve in order to obtain predetermined pressures of the fluid flowing through the valve;
(d) operating the fluid pressure source to provide a constant flow of fluid to the valve;
(e) energizing the solenoid of the valve with a constant current such that fluid flows through the valve;
(f) measuring the pressure of the fluid flowing at the valve;
(g) adjusting the current sent to the solenoid until a desired pressure has been obtained; and
(h) calibrating the valve by adding a correction offset factor based on the current adjustment to each of the nominal current values for future actuation of the solenoid of the valve, wherein adding the correction offset factor to each of the nominal current values does not change the direction of the magnetic field and wherein the nominal current value is configured to cause the solenoid to move towards an open position and the correction offset factor is configured to cause the solenoid to move further towards the open position.

* * * * *